Patented Aug. 8, 1939

2,168,587

UNITED STATES PATENT OFFICE 2,168,587

SOLVENT AND SOLUTION OF CELLULOSE ESTERS

Royal L. Shuman, Newark, N. J., assignor to Celluloid Corporation, a corporation of New Jersey No Drawing. Application January 12, 1934, Serial No. 706,360

3 Claims. (Cl. 106—37)

This invention relates to the preparation and use of phosphoric acid esters of phenols which contain alkyl or substituted alkyl radicals as nuclear substituents and which are of a higher order than cresols and xylenols.

An object of the invention is the preparation of heretofore unknown compounds and their uses as solvents, plasticizers, etc., of cellulose ethers and esters. Other objects of the invention will appear from the following detailed description.

The compounds prepared according to this invention are clear oily liquids at ordinary temperatures, boiling at above 300° C. They are light in color, neutral, inert, very stable, non-inflammable, non-volatile and not miscible in water. Incorporated in plastic compositions and coating materials containing cellulose ethers and esters and which may also contain resins, they remain a part of the solid constituents, due to their low vapor pressure, even at elevated temperatures, keping them plastic and flexible and making them much more durable. Their presence in plastic compositions and films of coating materials greatly reduces the inflammability of the materials. They are solvents for cellulose esters and ethers and resins and, therefore, materially aid in the dispersion of the cellulosic and resinous materials to produce homogeneous products.

These solutions may be used as lacquers, waterproofing agents, vehicles for grinding pigments, transformer oil, waxes, polishes, ink, softeners and modifiers for rubber and resins as well as for pressed, blown, molded or spun cellulose derivative plastic products.

These phosphate compounds are miscible with alcohols, polyhydric alcohols, hydro-carbons, esters and other solvents which are widely used in the arts utilizing cellulose ethers and esters and other similar plastic and resinous materials.

According to this invention I prepare phosphoric acid esters of phenols having, as a nuclear substituent, a radical containing an aliphatic carbon chain of at least two carbon atoms, one of which is directly attached to the nucleus, which compounds I may use as a solvent, plasticizer, vehicle or modifier for such plastic materials as the cellulose esters and ethers, resins, rubber and like materials. These compounds may be represented by the formula

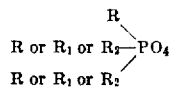

in which R is an alkyl phenyl radical containing two or more carbon atoms in the alkyl group. The alkyl group that forms the alkyl derivative of phenol may be ethyl, propyl, various isomers of butyl, amyl, etc. The alkyl group may also comprise the monovalent radical of a mono alkyl or aryl ether of a glycol as, for example, methoxy ethyl $C_2H_4OCH_3$, phenoxy propyl $C_3H_6OC_6H_5$, or the monovalent radical of a monoalkyl or aryl ether of a polyolefine glycol as for example the radical of the mono ethyl ether of diethylene glycol, $C_2H_5O—CH_2CH_2—O—CH_2—CH_2—$ or the radical of the mono phenyl ether of dipropylene glycol

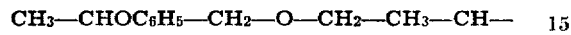

For convenience I shall refer to these groups of radicals as alkoxy alkyl radicals. $R_1$ may be a single alkyl radical such as methyl, ethyl, propyl, butyl, amyl, or alkoxy alkyl. $R_2$ may be an aryl radical such as phenyl, cresyl, xylenyl or benzyl. Physical mixtures of these various phosphate esters may also be employed as plasticizers or modifying agents in the preparation of plastic materials. For the purpose of simplifying the formula "R or $R_1$, or $R_2$" may be termed $R_3$.

These phosphate esters may be formed from the inter action of phosphoryl chloride and alkyl phenols having two or more carbon atoms in the alkyl radical. For example, about equal molecular proportions of para-tertiary amyl phenol may be caused to react with phosphoryl chloride. The reaction takes place upon mixing and applying heat. The reaction may be represented as follows:

This is cited only as an example and compounds such as phosphorus pentachloride or phosphorus trichloride and chlorine may be substituted for phosphorus oxychloride. Any of the alkyl phenols such as ethyl phenols, propyl phenols, butyl phenols and higher homologues may be substituted for para-tertiary amyl phenol and the hydroxy derivatives of the paraffin series such as the aliphatic alcohols and monovalent derivatives of glycols and glycerols, may be substituted in part for para-tertiary amyl phenol. Furthermore, mixtures of two or more of these are contemplated. The products resulting from the reaction may be single phosphoric esters, or they may be mixed esters of the phosphoric acid, depending upon the materials used. Examples of single phosphoric esters contemplated by this invention are, tripara tertiary amyl phenyl phosphate, triethyl phenyl phosphate, tri methoxy ethyl phenyl phosphate, etc. while examples of the mixed esters are dipara tertiary amyl phenyl monocresyl phosphate, mono para tertiary amyl phenyl mono cresyl mono methoxyethyl phosphate, dibutyl phenyl monophenyl phosphate, etc. Of course the various isomers available with cresols, xylenols, etc. add, naturally, to the complexity of the molecular structure.

The para-tertiary amyl-phenol that may be used as one of the base materials of the phosphoric esters of this invention may be made by the action of zinc chloride upon iso-amyl alcohol or tertiary amyl alcohol and phenol.

The phosphoric ester may be prepared by mixing in a suitable reaction kettle or retort para-tertiary amyl-phenol and phosphorus oxychloride or phosphoric anhydride in molecular proportions. Heat is then applied to accelerate the reaction. The final temperature may be 300° C. or more. In order to facilitate the removal of the hydrochloric acid gas formed during the reaction, an inert gas, such as carbon dioxide, may be passed into the vessel or the reaction may be carried out under vacuum. This prevents the formation of complex intermediate products and results in a higher yield and a product which is more stable and lighter in color. The crude material is distilled under vacuum and washed with a dilute alkaline solution to purify the product and thus a neutral ester is obtained.

Thus, for example, tri-para-tertiary amyl-phenyl phosphate is made as follows: 492 parts of para-tertiary amyl phenol by weight and 153 parts of phosphorus oxychloride by weight are heated in a suitable vessel provided with a reflux condenser to 250° C. or more. The temperature may be varied as required for different materials and the time of heating may take from four to eight hours. The heating is continued until there is no more evolution of hydrochloric acid gas. The oily product remaining in the retort is more or less colorless and contains impurities which it is preferable to remove. To do this, the crude material is distilled under an absolute pressure of 15 mm. of mercury or less, which gives an oily liquid practically water white. To remove the other impurities, such as free para-tertiary amyl phenol and mineral acids, it is washed with a dilute alkaline solution and may be further purified by treatment with water soluble permanganates such as the sodium or potassium permanganates. A 2% sodium hydroxide solution at 65° C. is suitable for washing the material. The product is stable and inert at ordinary temperatures, but in the refining process it is usual to distill under reduced pressure so as to avoid decomposition.

These esters have low vapor pressures and high boiling points and other desirable properties that make them excellent plasticizers. Typical compositions in which these esters are used as plasticizers in various plastic and coating materials are as follows:

Example 1

| | Parts by weight |
|---|---|
| Cellulose nitrate | 100 |
| Tri-para tertiary amyl phenyl phosphate | 25 |
| Volatile solvents | As required |

Example 2

| | Parts by weight |
|---|---|
| Cellulose acetate | 100 |
| Tri-para tertiary amyl phenyl phosphate | 30 |
| Acetone | 300 |
| Diacetone alcohol | 50 |

Example 3

| | Parts by weight |
|---|---|
| Cellulose nitrate (low viscosity) | 10 |
| Tri-para tertiary amyl phenyl phosphate | 5 |
| Ethyl acetate | 5 |
| Ethyl alcohol | 5 |
| Butanol | 5 |
| Butyl acetate | 5 |
| Toluol | 40 |

To 480 parts of material prepared according to Example 2 may be added 30 parts of a resinous product (e. g. resulting from the condensation of formaldehyde and a mixture of ortho and paratoluene sulphonamid) or 30 parts of such a resin and 25 parts of monoethyl-para-toluene-sulphonamide. To 95 parts of the material prepared, according to Example 3, may be added 5 parts of dewaxed dammar or a resin of the glycerol-phthalic anhydride type or other compatable resins or gums.

Wide variations are permissible in the proportions of cellulose esters, resins, solvents and plasticizers, as well as in the composition of the solvent mixture. Pigments, dyes, softeners, other plasticizers and/or other ingredients may also be added. Resins and/or gums other than those named, such as synthetic resins, Glyptals, phenol formaldehyde, urea formaldehyde, Vinylite, ester gum, or the neutral resins such as dammar, kauri, pontianac, copal, etc., may be employed.

The amounts and types of solvents and plasticizers may be varied according to the use desired of the material. The cellulose esters containing large or small amounts of the tri-para tertiary amyl phenyl phosphate or similar phosphates may be worked, flowed, pressed or otherwise formed to sheets, films, foils or slabs, which in turn may be cut, stamped or embossed into other types of articles. The cellulose esters containing suitable amounts of the phosphoric acid esters of phenols which contain alkyl or substituted alkyl radicals as nuclear substituents may be formed into solutions that may be forced through spinnerets and formed into yarns and filaments. The phosphoric acid ester may be mixed or kneaded with the plastic material or mixed into a solution or dispersion of same, or it may be applied as a coating to formed products of the plastic material.

The plasticizer, although adapted to enhance the properties of most plastic materials of the organic type, such as resins, rubber, etc., is exceptionally well adapted for plasticizing the esters of cellulose such as, for example, cellulose nitrates, cellulose acetate, cellulose formate, cellulose propionate and cellulose butyrate. The plasticizers may also be used to a great advantage with organic ethers of cellulose, such as ethyl cellulose, methyl cellulose and benzyl cellulose.

While the plasticizers resulting from this invention are applicable to plastic materials that are to be molded, shaped, roller or formed by extrusion methods they are exceptionally well adapted for use in the lacquer and coating material field. These lacquers may have as a base a cellulose derivative and may contain in addition to the plasticizers of this invention other plasticizers and compatible gums or resins as well as colors and pigments if desired. These lacquers may be applied by spraying, brushing or dipping of the article to be coated and result in films which will be hard, durable, lustrous, tough and continuous.

Having described my invention, what I desire to secure by Letters Patent is:

1. A composition of matter comprising a cellulose ester and a plasticizer for said cellulose ester comprising a substance selected from the group consisting of tripara tertiary amyl phenyl phosphate, triethyl phenyl phosphate, tri methoxy ethyl phenyl phosphate, dipara tertiary amyl phenyl mono cresyl phosphate, mono para tertiary amyl phenyl mono cresyl mono methoxy ethyl phosphate and dibutyl phenyl monophenyl phosphate.

2. A composition of matter comprising cellulose nitrate and a plasticizer for said cellulose nitrate comprising a substance selected from the group consisting of tripara tertiary amyl phenyl phosphate, triethyl phenyl phosphate, tri methoxy ethyl phenyl phosphate, dipara tertiary amyl phenyl mono cresyl phosphate, mono para tertiary amyl phenyl mono cresyl mono methoxy ethyl phosphate and dibutyl phenyl monophenyl phosphate.

3. A composition of matter comprising cellulose acetate and a plasticizer for said cellulose acetate comprising a substance selected from the group consisting of tripara tertiary amyl phenyl phosphate, triethyl phenyl phosphate, trimethoxy ethyl phenyl phosphate, dipara tertiary amyl phenyl mono cresyl phosphate, mono para tertiary amyl phenyl mono cresyl mono methoxy ethyl phosphate and dibutyl phenyl monophenyl phosphate.

ROYAL L. SHUMAN.

CERTIFICATE OF CORRECTION.

Patent No. 2,168,587.

August 8, 1939.

ROYAL L. SHUMAN.

It is hereby certified that error appears in the printed specification of the above numbered patent requiring correction as follows: Page 2, second column, line 29, for the word "neutral" read natural; line 64, for "roller" read rolled; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.

Having described my invention, what I desire to secure by Letters Patent is:

1. A composition of matter comprising a cellulose ester and a plasticizer for said cellulose ester comprising a substance selected from the group consisting of tripara tertiary amyl phenyl phosphate, triethyl phenyl phosphate, tri methoxy ethyl phenyl phosphate, dipara tertiary amyl phenyl mono cresyl phosphate, mono para tertiary amyl phenyl mono cresyl mono methoxy ethyl phosphate and dibutyl phenyl monophenyl phosphate.

2. A composition of matter comprising cellulose nitrate and a plasticizer for said cellulose nitrate comprising a substance selected from the group consisting of tripara tertiary amyl phenyl phosphate, triethyl phenyl phosphate, tri methoxy ethyl phenyl phosphate, dipara tertiary amyl phenyl mono cresyl phosphate, mono para tertiary amyl phenyl mono cresyl mono methoxy ethyl phosphate and dibutyl phenyl monophenyl phosphate.

3. A composition of matter comprising cellulose acetate and a plasticizer for said cellulose acetate comprising a substance selected from the group consisting of tripara tertiary amyl phenyl phosphate, triethyl phenyl phosphate, trimethoxy ethyl phenyl phosphate, dipara tertiary amyl phenyl mono cresyl phosphate, mono para tertiary amyl phenyl mono cresyl mono methoxy ethyl phosphate and dibutyl phenyl monophenyl phosphate.

ROYAL L. SHUMAN.

CERTIFICATE OF CORRECTION.

Patent No. 2,168,587.   August 8, 1939.

ROYAL L. SHUMAN.

It is hereby certified that error appears in the printed specification of the above numbered patent requiring correction as follows: Page 2, second column, line 29, for the word "neutral" read natural; line 64, for "roller" read rolled; and that the said Letters Patent should be read with this correction therein that the same may conform to the record of the case in the Patent Office.

Signed and sealed this 12th day of September, A. D. 1939.

(Seal)

Henry Van Arsdale,
Acting Commissioner of Patents.